(12) United States Patent
Hille et al.

(10) Patent No.: US 9,236,822 B2
(45) Date of Patent: Jan. 12, 2016

(54) ELECTROMOTIVE FURNITURE DRIVE INCLUDING A POWER SUPPLY DEVICE

(75) Inventors: Armin Hille, Bielefeld (DE); Christian Müller, Steinheim (DE)

(73) Assignee: DEWERTOKIN GMBH, Kirchlengern (DE)

( * ) Notice: Subject to any disclaimer, the term of this patent is extended or adjusted under 35 U.S.C. 154(b) by 112 days.

(21) Appl. No.: 14/115,971

(22) PCT Filed: May 4, 2012

(86) PCT No.: PCT/EP2012/058218
§ 371 (c)(1),
(2), (4) Date: Jan. 23, 2014

(87) PCT Pub. No.: WO2012/152681
PCT Pub. Date: Nov. 15, 2012

(65) Prior Publication Data
US 2015/0054429 A1    Feb. 26, 2015

(30) Foreign Application Priority Data
May 6, 2011    (DE) .......................... 10 2011 050 194

(51) Int. Cl.
*H02P 1/00* (2006.01)
*H02P 7/00* (2006.01)
(Continued)

(52) U.S. Cl.
CPC . *H02P 7/18* (2013.01); *A47B 13/00* (2013.01); *A47B 96/00* (2013.01); *A47C 1/02* (2013.01); *A47C 17/86* (2013.01); *A47C 20/041* (2013.01); *H02H 3/12* (2013.01); *H02P 29/00* (2013.01)

(58) Field of Classification Search
CPC ........... G05B 2219/2637; G05B 19/40; G05B 2219/37169; G05B 2219/37622; G05B 2219/45022; G05B 19/23; H02P 21/146; Y02T 10/643; Y02T 10/7258; B62B 2301/08; Y10S 180/907; A63F 2300/1018
USPC .......... 318/280, 283, 445; 180/6.1; 701/1, 49, 701/36, 31.6; 307/77, 126
See application file for complete search history.

(56) References Cited

U.S. PATENT DOCUMENTS 4,434,468 A * 2/1984 Caddick et al. .................. 701/49
4,463,426 A * 7/1984 Caddick et al. .................. 701/49

(Continued)

FOREIGN PATENT DOCUMENTS

DE    44 00 657 C1    3/1995
DE    298 16 022 U1    10/1998

(Continued)

OTHER PUBLICATIONS

International Search Report issued by the European Patent Office in International Application PCT/EP2012/058218 on Sep. 27, 2012.

*Primary Examiner* — Paul Ip
(74) *Attorney, Agent, or Firm* — Henry M. Feiereisen LLC

(57) ABSTRACT

An electromotive drive for furniture, includes a power supply device, a manual control, and a control device. The power supply device has an disconnecting unit that can be controlled by means of a control line, the electrical control signal of said control line being able to be modified by a switching contact of the manual control such that, when the manual control has not been actuated, the power supply device can be switched into the "disconnection" operating state, said disconnecting unit being connected to a signal feedback arrangement of a control circuit of the power supply device and being integrated in a path of said signal feedback arrangement, or said disconnecting unit being set in, or placed on, an input path or an output path of the control device.

12 Claims, 3 Drawing Sheets

(51) Int. Cl.
*H02P 7/18* (2006.01)
*H02P 29/00* (2006.01)
*A47C 20/04* (2006.01)
*A47B 13/00* (2006.01)
*A47B 96/00* (2006.01)
*A47C 1/02* (2006.01)
*A47C 17/86* (2006.01)
*H02H 3/12* (2006.01)

(56) References Cited

U.S. PATENT DOCUMENTS

| | | | |
|---|---|---|---|
| 5,944,131 A * | 8/1999 | Schaffner et al. | 180/65.1 |
| 6,100,607 A * | 8/2000 | Olivieri et al. | 307/125 |
| 6,176,335 B1 * | 1/2001 | Schaffner et al. | 180/65.1 |
| 6,199,647 B1 * | 3/2001 | Schaffner et al. | 180/65.1 |
| 6,614,199 B1 * | 9/2003 | Bokamper et al. | 318/445 |
| 6,692,451 B2 * | 2/2004 | Splane, Jr. | 601/5 |
| 7,276,814 B2 * | 10/2007 | Pozzuoli et al. | 307/77 |
| 7,341,565 B2 * | 3/2008 | Splane et al. | 601/5 |
| 7,443,054 B2 * | 10/2008 | Pozzuoli et al. | 307/77 |
| 8,065,051 B2 * | 11/2011 | Chopcinski et al. | 701/36 |
| 8,073,585 B2 * | 12/2011 | Jaenke et al. | 701/31.6 |
| 8,073,588 B2 * | 12/2011 | Peters et al. | 701/36 |
| 8,127,875 B2 * | 3/2012 | Mattes et al. | 180/65.8 |
| 8,264,458 B2 * | 9/2012 | Cooper et al. | 345/161 |
| 8,285,440 B2 * | 10/2012 | Jaenke et al. | 701/33.1 |
| 8,793,032 B2 * | 7/2014 | Peters et al. | 701/1 |
| 8,977,431 B2 * | 3/2015 | Peters et al. | 701/36 |
| 2001/0011613 A1 * | 8/2001 | Schaffner et al. | 180/65.1 |
| 2005/0195166 A1 * | 9/2005 | Cooper et al. | 345/161 |
| 2005/0233807 A1 * | 10/2005 | Tai | 463/36 |
| 2005/0246828 A1 * | 11/2005 | Shirai et al. | 4/420.4 |
| 2007/0055424 A1 * | 3/2007 | Peters et al. | 701/36 |
| 2007/0056780 A1 * | 3/2007 | Jaenke et al. | 180/65.1 |
| 2007/0056781 A1 * | 3/2007 | Mattes et al. | 180/65.1 |
| 2007/0056782 A1 * | 3/2007 | Chopcinski et al. | 180/65.1 |
| 2009/0153370 A1 * | 6/2009 | Cooper et al. | 341/21 |
| 2009/0267420 A1 * | 10/2009 | Kristensen | 307/126 |
| 2012/0016548 A1 * | 1/2012 | Jaenke et al. | 701/22 |
| 2012/0130590 A1 * | 5/2012 | Chopcinski et al. | 701/36 |
| 2012/0143393 A1 * | 6/2012 | Peters et al. | 701/1 |
| 2012/0166020 A1 * | 6/2012 | Mattes et al. | 701/1 |

FOREIGN PATENT DOCUMENTS

| | | |
|---|---|---|
| DE | 101 07 469 A1 | 9/2002 |
| EP | 0 887 904 A2 | 12/1998 |

\* cited by examiner

ELECTROMOTIVE FURNITURE DRIVE INCLUDING A POWER SUPPLY DEVICE

CROSS-REFERENCES TO RELATED APPLICATIONS

This application is the U.S. National Stage of International Application No. PCT/EP2012/058218, filed May 4, 2012, which designated the United States and has been published as International Publication No. WO 2012/152681 and which claims the priority of German Patent Application, Serial No. 10 2011 050 194.0, filed May 6, 2011, pursuant to 35 U.S.C. 119(a)-(d).

BACKGROUND OF THE INVENTION

The invention relates to an electromotive furniture drive, comprising a power supply device for adjusting movable furniture components relative to one another.

Such electromotive furniture drives are known in various embodiments. They are implemented as linear drives having a linearly adjustable output element or as rotational drives having a rotating output element and have proven themselves extremely well in practice. The linear drives have one or a number of electric motors, wherein a speed reduction gear is connected downstream of each motor and a further gear in the form of a threaded spindle gear for example is connected downstream of the speed reduction gear, which further gear generates a linear movement of the output element from the rotational movement of the motor. The rotational drives have at least one speed reduction gear connected downstream of the respective electric motor, wherein the last gearing element forms the output element. The output element of the respective electromotive furniture drive is connected to a fixed furniture component and/or to a movable furniture component, so that the movable furniture components are adjusted relative to one another during operation of the electric motor. The furniture can be implemented as a slatted frame, worktable, bed, reclining surface, treatment couch, hospital or healthcare bed, and also as a lifting device for persons such as lifters or patient lifters.

Switched-mode power supplies have shown excellent performance as power supply devices in the operation of the electromotive furniture drives. The power supply device has different operating states, i.e. an off operating state when disconnected from the mains, a start-up operating state until regular operation after connection to the mains, and an operational operating state in regular operation. The switched-mode power supplies comprise an isolating transformer switched by a control module with high frequency, which isolating transformer can also be designated as a transformer or a high-frequency transformer which is switched on and off by an upstream semiconductor switch on the primary side with a high switching frequency. For this purpose, a separate intermediate current circuit is associated with the control module which comprises an energy source of the control module and supplies the control module with electrical power.

If the power supply device is not connected to the mains or at least not for a period of time, the power supply device is in the "off" operating state, wherein all energy storage means such as capacitors for example are practically powerless. If the power supply device is connected to the mains, the operating state changes at first from the "off" operating state to the "start-up" operating state. The power source of the control module is connected to a charging circuit and supplies the power source in the start-up operating state with electrical power. Such an energy source with an associated charging circuit is known from the state of the art and has proven its excellence.

The state of the art of the mains disconnection device will be explained in closer detail, wherein the mains disconnection device comprises at least one switch controlled on the mains side in form of a relay switch or a semiconductor switch for disconnection from the mains. In the non-excited state of the mains disconnection device, the at least one controlled switch is in an open state and does not conduct any mains voltage to the power supply device. If the user operates a button on manual control, the mains disconnection device switches from the non-excited state to the excited state, wherein the controlled switch or the contacts of the controlled switch change to a closed state, wherein the power supply device is supplied with electrical power from the mains.

The mains disconnection devices have proven their excellence in practice, since they produce electrical isolation resp. disconnection from the mains and do not have any electrostatic alternating field at the output in the "isolation" resp. "disconnected" state. The costs are far from irrelevant however and the mounting effort is respectively high, since the mains disconnection devices are preferably arranged in a housing with attached mains plug.

SUMMARY OF THE INVENTION

The invention is based on the object of simplifying an electromotive furniture drive with a power supply device of the kind described above in closer detail with improved functionality by means of circuitry measures.

This object is achieved in an electromotive furniture drive with a power supply device in such a way that the power supply device comprises a disconnecting unit that can be controlled by means of a control line, wherein the electric control signal of the control line is variable by a switching contact of the manual control in such a way that the power supply device assumes the "disconnected" operating state in the non-actuated state of the manual control.

The controllable disconnecting unit is controlled by the respective pushbutton switch of the manual control, wherein a control signal is triggered by manually pressing the pushbutton and is supplied via the control line to the disconnecting unit connected thereto.

The disconnecting unit is further effectively in connection with a signal feedback of a feedback control circuit of the power supply device. A first embodiment provides that the disconnecting unit is integrated in a path of the signal feedback. Another embodiment provides a disconnecting unit which is inserted in or on, or attached to, an input path or output path of the control device.

The controllable disconnecting unit is provided with a function that in the event of a change in the signal of the control line that is connected thereto the signal feedback of the power supply device is changed in such a way that it is possible to change over via the control output of the control device of the power supply device between a high-frequency switching signal in the operating state of regular operation and no high-frequency signal in the "disconnected" operating state.

As a result, all initially mentioned components of a disconnecting unit of the state of the art as mentioned above can be avoided, because the power supply device of the state of the art which is arranged as a switched-mode power supply can be expanded only slightly in the manner in accordance with the invention and the electrical isolation of the transformer unit can be utilized, so that the power supply device in the "disconnected" operating state acts itself as a disconnection device in accordance with the invention, or represents such a device.

Principally, although the primary side of the input circuit and parts of the intermediate circuit which will be described below in closer detail are under mains voltage in the "disconnected" operating state, there is no high-frequency triggering of the transformer unit since the entire control circuit of the power supply device is virtually deactivated by the controllable disconnecting unit in the "disconnected" operating state, so that no electrostatic alternating fields are produced in the "disconnected" operating state and there is no power consumption by the transformer unit. A power supply device is thus provided in a further manner in accordance with the invention which in the unused state of the electromotive furniture drive assumes the "disconnected" operating state and shows a standby power of distinctly less than 0.5 W.

The potential of the signal feedback of the switched-mode power supply units known from the state of the art and arranged as power supply devices can rise with the switching frequency on the transformer unit with rising frequency or decrease with rising frequency, depending on the arrangement of the switched-mode power supply unit. For this reason, several arrangements of disconnecting units can be considered, which all ensure that in the "disconnected" operating state no high-frequency signal is applied to the transformer unit.

A first embodiment of a disconnecting unit is formed by a junction or by a feeding point, wherein a relatively high voltage (e.g. a supply voltage of 5 V) is supplied to the signal feedback, wherein the supply voltage means the maximum amount of the potential on signal feedback and, as a result, the control device does not transmit any high-frequency switching signal to the circuit module, so that no high-frequency signal is applied to the transformer. Furthermore, a mains-free auxiliary power source in form of a battery or a capacitor with high capacitance is provided, wherein in the non-actuated state of the manual control a transistor switch or a contact of the manual control is switched and electrical power is supplied from the auxiliary power source to the feeding point.

A second embodiment of a disconnecting unit is formed by another junction in the path of the signal feedback, wherein the signal feedback is arranged as a high-resistance control path, and a switching transistor or a contact of the manual control pushbutton is attached to the junction.

In the non-actuated state of the manual control, the switching transistor is conductive or the contact of the manual control push button is closed, wherein the electric potential of the junction or the electric potential of the signal feedback is switched against ground. The result of a potential-free state of the signal feedback means in this embodiment that the control device does not transmit any high high-frequency signal to the circuit module, so that no high high-frequency signal is applied to the transformer.

A third embodiment of a disconnecting unit provides an electrical isolation reap. disconnection means in form of a transmitting coupling element. When the input of said unit is supplied with voltage, the state changes at its output, wherein the state of the output comprises a switching signal, a voltage signal or a frequency signal. In a preferred embodiment of the disconnecting unit, it is arranged as an optical coupler or photovoltaic coupler, wherein the output of the disconnecting unit comprises a switching signal and/or a voltage signal in this case. The disconnecting unit will be explained below in closer detail by reference to an example of a disconnecting unit arranged as an optical coupler.

The switching output of the optical coupler is preferably operatively connected to the signal feedback. The switching output of the optical coupler in an electrical series connection is inserted into the path of the signal feedback in one embodiment. Since such disconnecting units offer electrical isolation between their input and output, such a disconnecting unit can also be attached in another embodiment to the control device, or it can be inserted therein. It is therefore possible that the output of the optical coupler is in electrically conductive connection to the input of the control device or the frequency output of the control device or the power supply connection of the control device.

A high-resistance power supply of the control device is provided in one embodiment in accordance with this embodiment. The switching outputs of the optical coupler or the switching outputs of a transistor switch controlled by the switching output of the optical coupler are advantageously connected to the power supply connections of the control device in such a way that the power supply connections of the control device are connected to each other in the non-actuated state of the manual control and/or in the "disconnected" operating state. As a result, the control device is switched to a non-operational state on the power input side, and since the power supply device of the control device is arranged with high resistance, only very low leakage current will flow in this case.

The disconnecting unit which is arranged as an electrical isolation resp. disconnection means further comprises a signal input which is connected to the control line. The switching of the potential of the control line occurs effectively by the manual actuation of the pushbutton of the manual control. Depending on the arrangement of the power supply device which is arranged as a switched-mode power supply, the potential switched to the control line needs to be adjusted. In a first embodiment of a power supply device forming a switched-mode power supply, it is provided in the case of a non-actuated button of the manual control that the potential of the control line is 0 V or approximately 0 V. As a result, no high-frequency switching signal is supplied to the transformer unit. A preferred embodiment provides however that in the case of a non-actuated button of the manual control the potential of the control line on the disconnecting unit has a voltage of several volts, e.g. 5 V or 24 V. As a result, the output of the disconnecting unit will switch in this embodiment in such a way that no high-frequency switching signal can be supplied to the transformer unit. An auxiliary voltage source in form of a battery or a capacitor of high capacitance is provided in this embodiment, wherein the capacitor can be arranged as a gold cap. The auxiliary voltage source is advantageously arranged on the secondary unit of the power supply device and is charged in the operating state of regular operation or supplied with power for maintaining the charge.

The auxiliary voltage source is additionally arranged as a voltage source for operating transmitting receivers such as radio receivers or infrared receivers, or for the operation of processor units. Once the auxiliary voltage source has been sufficiently charged by the power supply device in the operating state of regular operation and if in addition no button of the manual control is actuated, a current circuit is closed which conducts the power from the auxiliary voltage source to the input of the disconnecting unit. As a result, the disconnecting unit will isolate, which means that the transformer unit is not supplied with any high-frequency switching signal and the power supply device is provided with the "disconnected" operating state. The energy potential of the auxiliary voltage source decreases with increasing time in such a way that it can be expected that the input of the disconnecting unit will no longer have sufficient power for maintaining the switching state of its output. If the energy potential of the auxiliary voltage source decreases even further, the output of the disconnecting unit will be subjected to a changeover, as a result of which the high-frequency switching signal on the transformer unit will be activated and the power supply device assumes the operating state of regular operation. Automatic recharging of the auxiliary voltage source by the secondary unit occurs in this way.

If the power supply device is in the "disconnected" operating state and if a button of the manual control is actuated, the current circuit between the auxiliary voltage source and the input of the disconnecting unit will be opened according to the embodiment as described above. This occurs in a simple way in that the button of the manual control is associated with an opening contact. A preferred embodiment of an opening contact in the current circuit between the auxiliary voltage source and the input of the disconnecting unit provides a transistor switch however, which is switched conductive in the currentless state and its control connection is connected in an electrically conductive manner to a contact connection of a button of the manual control which is arranged as a make-contact element.

Further characteristics and features are provided in the description of a preferred embodiment below and are the subject matter of further sub-claims.

BRIEF DESCRIPTION OF THE DRAWING

The invention will be explained below in closer detail by reference to the enclosed drawings, wherein:

FIG. 1 shows an electromotive furniture drive 1 with an energy supply device 5.

DETAILED DESCRIPTION OF PREFERRED EMBODIMENTS

Figure 1:
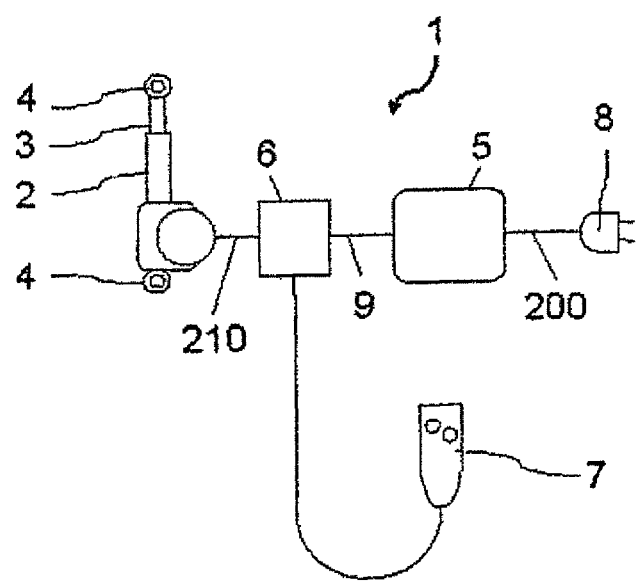
FIG. 1 shows an exemplary and schematic illustration of a furniture drive arranged in accordance with the invention as a linear drive and comprising a power supply device.

The electromotive furniture drive 1 is arranged as a so-called linear drive 2, and the power supply device 5 is implemented as a switched-mode power supply. The linear drive 2 has a lifting pipe 3 which is extendable and retractable depending on the rotational direction of an electric motor (not shown in greater detail), on whose free end a connecting part in the form of a clevis 4 is attached. A further connecting part in the form of a further clevis 4 is fastened on the housing of the linear drive 2. The respective connecting part is connected in a way not shown in greater detail to a respective furniture component, so that during operation of the electric motor the furniture components connected to the linear drive 2 move relative to one another.

The power supply device 5 is connected according to the illustration of FIG. 1 via a mains cable 200 to a mains plug 8, wherein the mains plug 8 can be arranged on the power supply device 5 in another embodiment not shown in closer detail. It needs to be mentioned that the power supply device 5 according to the illustration of FIG. 1 is provided with an enclosing housing, so that the mains plug 8 can be attached to the housing or be integrally formed thereon. The mains plug 8 conducts the input-side mains voltage via the mains cable 200 to the power supply device 5 arranged as a switched-mode power supply, which supplies a low voltage in form of a DC voltage on the secondary side and conducts said voltage to a motor controller 6.

A manual control 7 is connected in wire-bound form to the motor controller 6, wherein the manual control 7 comprises two pushbuttons according to the illustration of FIG. 1. In accordance with a further embodiment (not shown in greater detail), the manual control 7 is coupled via a wireless transmission section with the motor controller 6 and transmits radio waves or infrared light waves to the motor controller 6 to control the at least one electric motor, i.e. the linear drive 2.

In accordance with the illustration of FIG. 1, the manual control 7 is connected to a motor controller 6 in a first embodiment, wherein the motor controller 6 is arranged as a relay controller with relay switches or/and as a semiconductor circuit with semiconductor switches. The pushbuttons of the manual control 7 which can be actuated manually switch the control current of the relay switches or semiconductor switches, wherein the power switches of the relay switches or the semiconductor switches switch the high motor current of the linear drive 2.

In accordance with the illustration of FIG. 1, the manual control 7 is connected to a motor controller 6 in a second embodiment, which connects a supply cable 9 of the power supply device 5 and a motor cable 210 of the electric motor of the linear drive 2 and the electric lines of the manually actuated pushbuttons of the manual control 7 to each other. In accordance with this embodiment, the contacts of the manually actuated pushbuttons of the manual control 7 are arranged as power switches and switch the high motor current upon pressing the buttons.

In a further developed embodiment, which is not shown in closer detail, the power supply device 5 is inserted into or attached to the housing of the linear drive 2, wherein the linear drive 2 can be arranged in the manner of a double drive (not shown in closer detail), which accommodates at least one motor, but preferably two motors, in a common housing.

Figure 2:
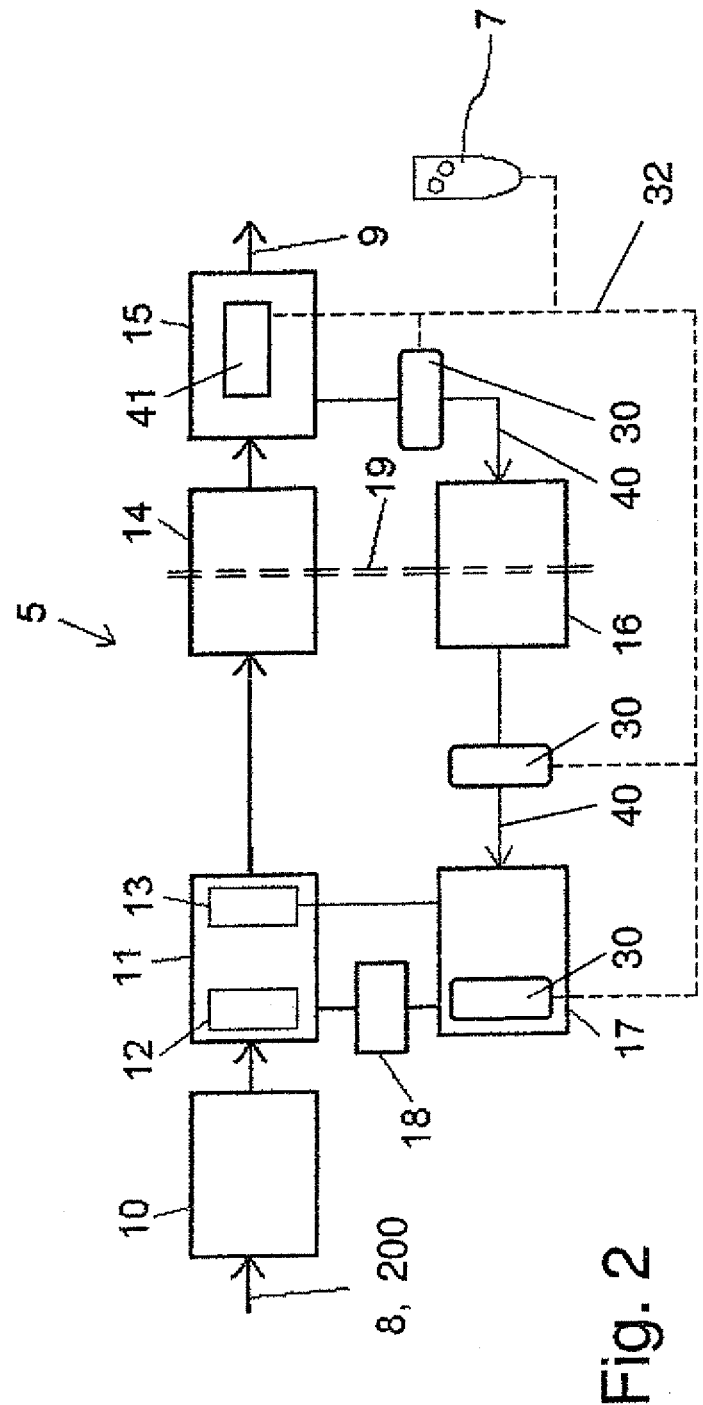
FIG. 2 shows a schematic block diagram of an embodiment of the power supply device according to FIG. 1.

FIG. 2 shows a schematic block diagram of a first embodiment of the power supply device 5 according to FIG. 1.

The power supply device 5 comprises an input circuit 10, an intermediate circuit 11, a transformer unit 11, a secondary unit 15, an optical coupler 16, a control device 17 and a control supply unit 18.

The input circuit 10 can be coupled on the input side (indicated by arrows) with the mains via mains plug 8 and the mains cable 200. The input circuit 10 contains the usual interference suppression units such as capacitors and throttles and also fuses, which are not shown here in closer detail. The input circuit 10 is connected to the intermediate circuit 11 which comprises a rectification 12 and a circuit module 13 such as a switching transistor. The intermediate circuit 11 is coupled with the circuit module 13 to the transformer unit 14. The transformer unit 14 comprises a transformer with electrical isolation 19, which extends through the power supply device 5. The secondary unit 15 is connected to the secondary side of the transformer unit 14, which secondary unit provides a supply voltage Uv for supplying the linear drive 2 via the supply cable 9 to the motor controller 6. A feedback of the secondary unit 15 is arranged by an optical coupler 16 with electrical isolation 19 to the control device 17. The control device 17 controls the circuit module 13 for the feedback control of the supply voltage Uv of the secondary unit 15. The control device 17 is supplied with electrical power by a control supply unit 18.

In one embodiment of the power supply device 5, the control device 17 and the circuit module 13 are coupled with the control loop and are wired in such a way that the level of the signal of the optical coupler 16 which is received by the control device 17 (wherein the input voltage of the optical coupler 16 is coupled with the supply voltage Uv on the output side) controls the control device 17 in such a way that the switching frequency of the circuit module 13 controlled by the control device 17 is guided. As a result, a feedback device is created for the control loop which can be supplied on the input side with the supply voltage Uv and which has the switching frequency of the circuit module 13 on the output side. The circuit module 13 switches the input coil of the transformer unit 14 in a high-frequency range and forms a transmission characteristic together with the transformer unit 14 which is arranged in a constructional respect in such a way that the transmittable electrical power of the transformer unit 14 varies depending on the triggerable switching frequency of the circuit module 13. The signal on the optical coupler 16 is variable with increasing current flow on the output side of the power supply device 5, which leads to a change in the switching frequency of the circuit module 13. If the current flow continues to increase on the output side of the power supply device 5, the switching frequency of the circuit module 13 changes in such a way that the transmission characteristic of the transformer unit assumes a less ideal state, leading to a reduction which is operatively connected to the output of the power supply device 5. In the case of a short-circuit or an high overload on the output side of the power supply device 5, switching-frequency limiting means are provided which form an intermediate controller with the input element of the circuit module 13 and the control device 17, and which limit the switching frequency of the circuit module in a controlling manner in such a way that the holding voltage Uh is obtained therefrom. As a result, at least the optical coupler 16, the control device 17, the circuit module 13, the transformer unit 14 and optionally also the secondary unit 15 are coupled with or arranged in the initially described control loop. Fixedly or a variably adjustable setting means are switched in or on the control loop which determine the level of the holding voltage Uh.

In accordance with the embodiment according to FIG. 2, the secondary unit 15 comprises an auxiliary voltage source 41 which is arranged as an off-mains auxiliary voltage source and a capacitor of high capacitance. The auxiliary voltage source 41 can be arranged as a mains-connected auxiliary voltage source and comprise an autotransformer with very low standby-current draw.

In a further preferable manner, which is also not shown in closer detail, the auxiliary voltage source 41 can be arranged as a mains-connected auxiliary voltage source. Said mains-connected auxiliary voltage source can comprise an economical transformer which is an isolating transformer of low power. The economical transformer is arranged in such a way that its standby-current draw is reduced in comparison with conventional (isolating) transformers of low power and is only very low.

FIG. 2 further shows a disconnecting unit 30, which in three exemplary embodiments is integrated in or attached to the signal feedback 40 between the secondary unit 15 and the optical coupler 16, or the signal feedback 40 between the optical coupler 16 and the control device 17, or the control device 17. Furthermore, a control line 32 is provided which connects the input of the disconnecting unit 32 with the manual control 7 in an electrically conductive manner, or which connects the input of the release unit to the auxiliary voltage source 41 in an electrically conductive manner.

Figure 3:
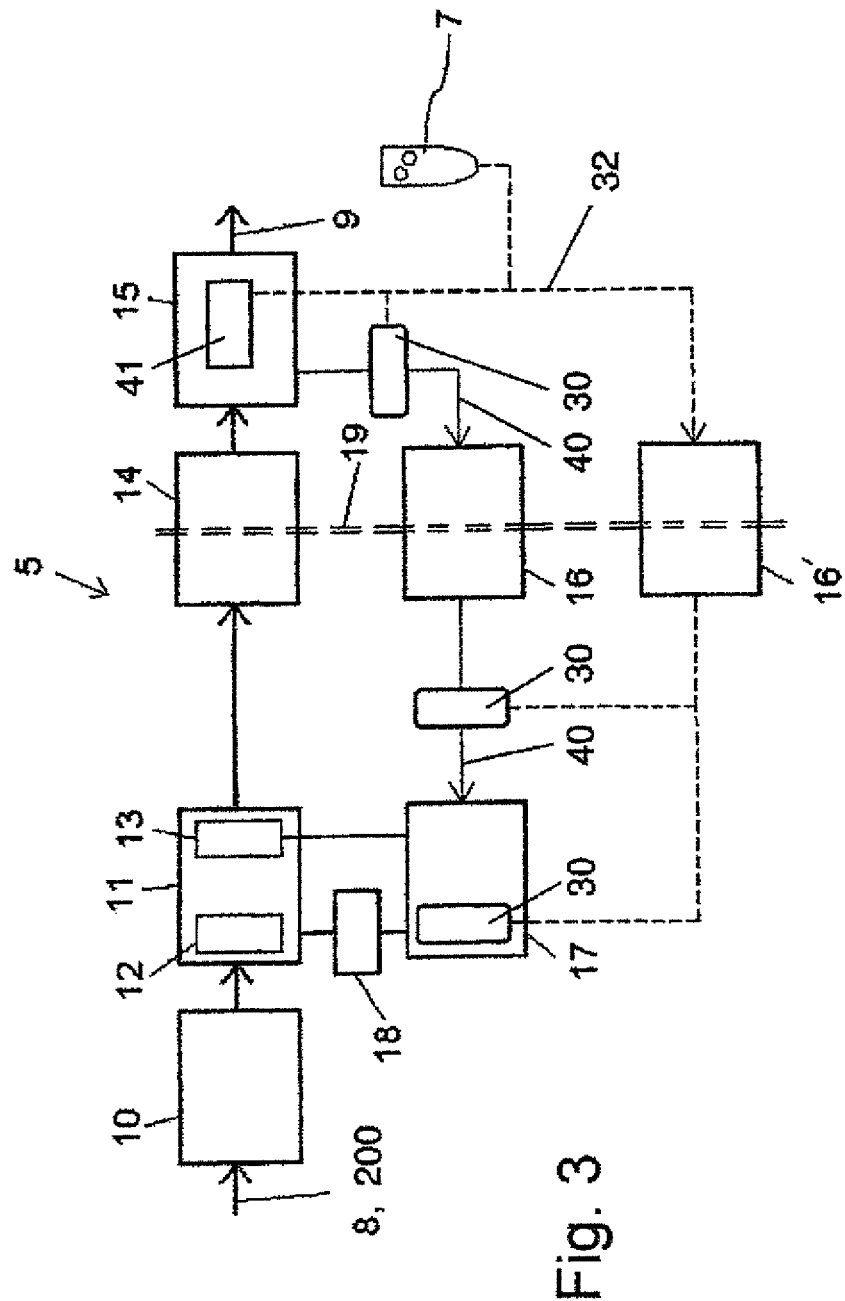
FIG. 3 shows a schematic block diagram of a further embodiment of the power supply device according to FIG. 1.

FIG. 3 shows a schematic block diagram of a further embodiment of the power supply device 5 according to FIG. 1.

The power supply device 5 of this further embodiment differs from that of the embodiment according to FIG. 2 in such a way that a coupling unit 16' is provided which is coupled on the secondary side with the control line 32 and which is connected on the primary side to the disconnecting unit 30, which is arranged either in the control device 17 or in the signal feedback 40. The coupling unit 16' also comprises the electrical isolation 19. The disconnecting unit 30 (either in the control device 17 or in the signal feedback 40) can therefore be arranged in this embodiment in an especially simple way without electrical isolation means, e.g. as a switching transistor.

The coupling unit 16' can be realized in different ways. It is possible for example that the coupling unit 16' is a further optical coupler which is also provided in photovoltaic arrangement. It is also possible that the coupling unit 16' is arranged as an electromechanical switch, e.g. as a miniature relay, with respective electrical isolation.

It is also possible that a combination of more than one disconnection device 30 is provided at different locations or in series.

In a further combination it is possible that the coupling unit 16' is arranged parallel to the control line 32 according to the embodiment according to FIG. 2 as a redundant control of the disconnection device 30.

The invention is not limited to the illustrated embodiments. It is relevant however that the power supply device 5 comprises an operating state of "disconnection" and a changeover into or out of the operating state of "disconnection" occurs by a disconnecting unit 30 which can be controlled by the manual control 7, which disconnecting unit is arranged in the signal feedback 40 of the control loop of the power supply device 5 arranged as a switched-mode power supply, or which is arranged on the control device 17 in such a way that in the operating state of "isolation" no high high-frequency switching signal is applied to one of the connections of the transformer unit 14.

What is claimed is:

1. An electromotive furniture drive for adjusting movable furniture components relative to one another, comprising:
a power supply device constructed as a switched-mode power supply unit and configured for assuming a "disconnection" operating state and an "operation" operating state, said power supply device including a mains connection for connection to a mains, wherein the power supply device is configured to transform an input voltage on a mains side into a low voltage on an output side, said power supply device further comprising an isolating transformer or a transformer unit for electrical isolation between the mains-connected input side and the low-voltage-supplying output side for operation of the electromotive furniture drive, an intermediate circuit, a control device for controlling the switched-mode power supply unit, a control supply unit associated with the control device, and a controllable disconnecting unit;
a manual control operably connected to the controllable disconnecting unit via a control line and having a switching contact for changing an electric control signal of the control line, wherein in response to a change of the control signal said disconnecting unit causes the control device to directly switch the power supply device to the operating state of "disconnection" in a non-actuated state of the manual control;
at least one electric motor configured for operation in opposite directions of rotation;
a speed reduction gear arranged downstream of the electric motor; and a gear arranged downstream of the speed reduction gear.

2. The electromotive furniture drive of claim 1, wherein the disconnecting unit is connected to a signal feedback of a control circuit of the power supply device, wherein the disconnecting unit is integrated in a path of the signal feedback, or wherein a disconnecting unit is inserted into or attached to an input path or an output path of the control device.

3. The electromotive furniture drive of claim 2, wherein the controllable disconnecting unit changes the signal feedback of the power supply device in response to a change in the signal of the control line so as to enable a change over via the control output of the control device between a high-frequency switching signal in an operating state of regular operation and a switching signal which does not act as a high-frequency signal in the operating state of "disconnection".

4. The electromotive furniture drive of claim 1, wherein the control circuit of the power supply device is deactivated by the controllable disconnecting unit in the operating state of "disconnection", so that the operating state of "disconnection" is assumed automatically in an idle state of the electromotive furniture drive.

5. The electromotive furniture drive of claim 1, further comprising an off-mains auxiliary power source in form of a battery or a capacitor, wherein the isolating unit is formed by a junction or feeding point, and wherein the auxiliary power source has a capacitance so that a transistor switch or contact of the manual control is switchable in the non-actuated state of the manual control.

6. The electromotive furniture drive of claim 2, wherein the disconnecting unit is formed by a junction in the path of the signal feedback, and wherein the signal feedback is arranged as a control path of relatively high resistance and a switching transistor or a contact of a pushbutton of the manual control is attached to the junction.

7. The electromotive furniture drive of claim 2, wherein the disconnecting unit comprises an electrical isolation or disconnection means in form of a transmitting coupler, and that the disconnecting unit is constructed as an optical coupler or as a photovoltaic coupler.

8. The electromotive furniture drive of claim 7, wherein the switching output of the optical coupler is in operative connection with the signal feedback, wherein the switching output of the optical coupler is inserted into an electrical series connection in the path of the signal feedback, and wherein the disconnecting unit is attached to or inserted into the control device.

9. The electromotive furniture drive of claim 7, wherein the switching outputs of the optical coupler or the switching outputs of a transistor switch controlled by the switching output of the optical coupler is connected to a power supply connections of the control device in such a way that in the non-actuated state of the manual control and/or in the operating state of "disconnection" the power supply connections of the control device are connected to each other.

10. The electromotive furniture drive of claim 1, wherein the disconnecting unit is constructed as an electrical disconnection means and comprises a signal input which is connected to the control line.

11. The electromotive furniture drive of claim 1, further comprising an auxiliary voltage source in form of a battery or a capacitor of relatively high capacitance, wherein the auxiliary voltage source is arranged on the secondary unit of the power supply device and is charged in the operating state of regular operation or is supplied with power for maintaining the charge.

12. The electromotive furniture drive of claim 1, wherein at least one button of the manual control is associated with a normally closed contact arranged in the current circuit between the auxiliary voltage source and the input of the disconnecting unit.

* * * * *